L. P. COULTER.
WELDING CONTROLLER.
APPLICATION FILED MAY 6, 1915.
1,215,913. Patented Feb. 13, 1917.
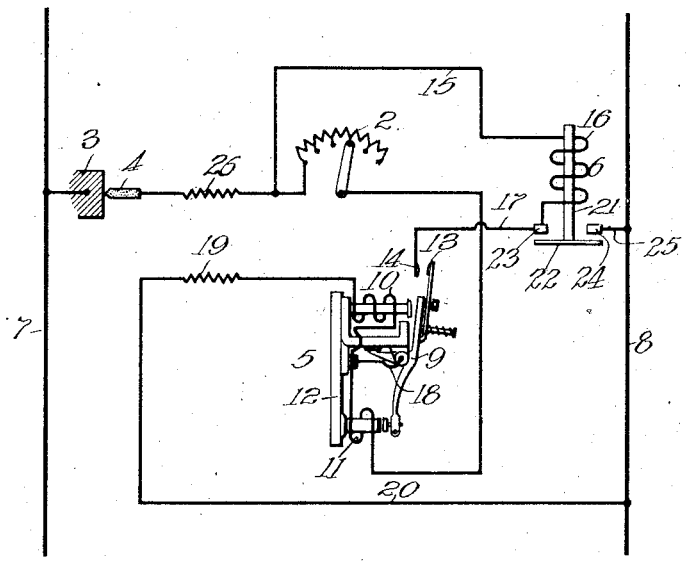
Witnesses:
Inventor
Leonard P. Coulter
By Edwin B. H. Tower Jr. Atty.

UNITED STATES PATENT OFFICE.

LEONARD P. COULTER, OF MILWAUKEE, WISCONSIN, ASSIGNOR TO THE CUTLER HAMMER MFG. CO., OF MILWAUKEE, WISCONSIN, A CORPORATION OF WISCONSIN.

WELDING-CONTROLLER.

1,215,913.  Specification of Letters Patent.  Patented Feb. 13, 1917.

Application filed May 6, 1915. Serial No. 26,270.

*To all whom it may concern:*

Be it known that I, LEONARD P. COULTER, a citizen of the United States, residing at Milwaukee, in the county of Milwaukee and State of Wisconsin, have invented new and useful Improvements in Welding-Controllers, of which the following is a specification.

This invention relates to welding controllers.

More particularly it relates to improvements in welding controllers of the type described in a co-pending application of Tower and Van Nest, Serial No. 13,608, filed March 11, 1915.

The welding controller described in said application is adapted for arc welding. It has a current limiting means in the circuit of the welding electrodes to prevent an excessive rush of current when the welding circuit is completed. An electromagnetic switch adapted to remain open when current through its operating means is high and to close when the current decreases to a predetermined value is connected in the welding circuit to exclude the current limiting means when the welding arc is drawn. When the switch is closed, its operating means remains in whole or in part in the welding circuit during the welding operation.

An object of the present invention is to provide an improved welding controller in which the switch operating means is automatically excluded from the welding circuit, after it has operated.

Another object is to provide a welding controller which will automatically control the welding current, automatically exclude the controlling apparatus after it has operated, and insure that the welding circuit is always in condition for safe operation.

Other objects and advantages of the invention will hereinafter appear.

The accompanying drawing is a diagrammatic view of a controller embodying the invention.

The controller comprises in general a current limiting means 2 for regulating the current through the welding electrodes 3 and 4, an automatic switch 5 responsive to current in the welding circuit for controlling the current limiting means and an electromagnetic switch 6 for shunting the automatic switch 5 after said switch has closed.

The current limiting means comprises a resistance 2 of any suitable type connected in series with electrodes 3 and 4 across supply mains 7 and 8. The resistance is adjustable by means of a movable arm so that the amount of resistance in circuit may be regulated. This resistance may be called, for convenience, the starting resistance. It is controlled by the automatic switch 5.

The switch 5 is provided with a movable member 9 electromagnetically controlled by windings 10 and 11 mounted on an insulating base 12. The movable member 9 carries a contact 13 adapted to engage a stationary contact 14. The switch is adapted to hold open when the current in its operating means is high and to close when the current decreases to a predetermined value. The windings 10 and 11 of the switch are connected in series and are therefore subject to the same electrical conditions. They have different pull characteristics which are so related that when the energizing current is high the switch is held open by winding 11 and when the current decreases to a predetermined value the switch is closed by winding 10. This switch is fully described in a co-pending application of Barnum and Date, Serial No. 800,700, filed November 13, 1913.

The switch is normally biased to open position by gravity. When the circuit through the operating means is broken, the movable member 9 automatically moves to open position and separates the contacts 13 and 14. The point at which the switch will close may be adjusted by adjusting the armature of winding 11 so as to vary the reluctance of the magnetic circuit. Other means of varying the relatively effectiveness of coils 10 and 11 may be employed. It should be understood that other types of switches which will hold open when current through their operating means is high and will close when the current decreases to a predetermined value may be used.

The windings 10 and 11 of switch 5 are connected in series with electrodes 3 and 4 through the resistance 2. They are therefore directly responsive to the current in the welding circuit. When the contacts 13 and 14 of the switch are closed, a shunt circuit is completed around the resistance 2 which may be traced from the positive line 7 through the electrodes 3 and 4, conductor 15, winding 16 of switch 6, conductor 17, contacts 13 and 14, switch member 9 and conductor 18, winding 10, resistance 19, conductor 20 to negative line 8. It will thus be seen that when the switch is closed the resistance 2 is excluded from the circuit and the coil 16 of switch 6 is energized.

The electromagnetic switch 6 has solenoid winding 16 adapted to operate a movable plunger 21. The plunger carries a bridging contact 22 which engages the contacts 23 and 24 when the switch is closed. The switch is normally biased to open position. Of course any other suitable form of electromagnetic switch may be used.

When the winding 16 is energized the plunger 21 is raised and the contacts 23 and 24 are bridged by the contact 22. A circuit is thus completed which may be traced as follows,—from positive line 7 through electrodes 3 and 4, conductor 15, coil 16, contacts 23, 22, 24 and conductor 25 to the negative line 8. This circuit shunts both the switch 5 and the resistance 2. The coil 16 of switch 6 remains in circuit and keeps the switch 6 closed until the welding circuit is deënergized.

A limiting resistance 26 which is in the welding circuit under all operating conditions is connected in series with starting resistance 2. This resistance prevents an absolute short-circuit in the event that after the arc has been established and the switches 5 and 6 have operated the electrodes are accidentally brought into contact. Of course the resistance 26 must be of such value that a proper welding current will flow while it is in the circuit.

The controller is shown in the drawing in normal position ready for operation. The switch 5 is open and the starting and limiting resistances are in series with the electrode. The operation of the controller is as follows:

The welding circuit is completed at the electrodes 3 and 4 and current flows from the positive line 7 through electrodes 3 and 4, resistance 26, resistance 2, winding 11, winding 10, resistance 19 and conductor 20 to negative line 8. An excessive rush of current is prevented by the starting resistance 2 and the limiting resistance 26. The switch 5 is adjusted to hold open for the relatively high current which flows when the circuit is first completed. As the electrodes are drawn apart to strike an arc the resistance between them increases and the current accordingly decreases. When the current decreases to a predetermined value the switch 5 closes thereby removing the starting resistance 2 from the welding circuit and allowing the current to flow directly from positive line 7 through electrodes 3 and 4, resistance 26, conductor 15, coil 16, conductor 17, contacts 13 and 14, switch member 9, coil 10, resistance 19 and conductor 20 to negative line 8. The coil 16 is thereby energized and the switch 6 closed. A circuit is completed from positive line 7 through electrodes 3 and 4, resistance 26, conductor 15, coil 16, switch contacts 23, 22, 24 and conductor 25 to negative line 8. This shunts the operating windings of switch 5 and the switch itself. Said switch then automatically moves to open position. The switch 6 keeps the welding current closed.

The starting resistance 2 is thus removed from the welding circuit by the switch 5 and the switch itself is thereafter excluded from the circuit by the switch 6. The elimination of the resistance 2 permits a heavy welding current to flow after the arc has been struck, the value of said current being determined mainly by the resistance of the arc. The exclusion of switch 5 protects it from the heavy welding current and permits the windings to be made smaller than would otherwise be required. Winding 16 of switch 6 is of sufficient size to carry the full welding current.

When the weld is completed and the electrodes are separated, the welding circuit is broken and the coil 16 of switch 6 is deënergized. At this time the switch 5 is already in open position. The switch 6 automatically opens and the resistance 2 is thereby reinserted in the welding circuit so that the controller is again in condition for operation.

It will thus be seen that a simple welding controller has been provided which will automatically protect the welding circuit and exclude the controlling apparatus after it has operated. The current is limited to a safe value until the resistance of the arc has increased, whereupon the automatic switch operates to exclude the current limiting means. The switch itself is then automatically excluded from the welding circuit. A heavy welding current is thus permitted to flow which is limited mainly by the resistance of the arc. The controller automatically reinserts the current limiting means when the welding circuit is broken and thereby insures that the apparatus is always in safe condition for operation.

It should be understood that the embodiment shown is for purposes of illustration only and that other structures may be devised which may embody the invention and which are included in the scope of the appended claims.

Having thus described my invention, what I claim as new and desire to secure by Letters Patent of the United States is:

1. A welding controller provided with a switch having electromagnetic operating means to hold it open under certain electrical conditions and to close it under other electrical conditions, means controlled by the switch for regulating the current in the welding circuit and means for deënergizing the switch upon closure thereof.

2. A welding controller provided with a switch having electromagnetic operating means to hold it open under certain electrical conditions and to close it under other electrical conditions, means controlled by the switch for regulating the current in the welding circuit and means rendered operative by the closure of the switch for rendering the switch inoperative.

3. A welding controller provided with a switch having electromagnetic operating means in the welding circuit to hold it open under certain electrical conditions and to close it under other electrical conditions, means controlled by the switch for regulating the current in the welding circuit and means for shunting the switch from the welding circuit upon closure thereof.

4. A welding controller provided with a switch having electromagnetic operating means to hold it open under certain electrical conditions and to close it under other electrical conditions, means controlled by the switch for limiting the current in the welding circuit and means rendered operative by the closure of the switch for shunting the switch from the welding circuit.

5. A welding controller provided with a switch having electromagnetic operating means to hold it open under certain electrical conditions and to close it under other electrical conditions, means controlled by the switch for regulating the current in the welding circuit and a second electromagnetic switch rendered operative by the closure of the first switch for shunting the first switch from the welding circuit.

6. A welding controller provided with a resistance to limit the welding current, a switch for controlling said resistance, electromagnetic operating means for the switch adapted to keep the switch open under certain electrical conditions and to close it under other electrical conditions and a second electromagnetic switch rendered operative by the closure of the first switch for shunting the first switch.

7. A welding controller provided with a resistance to limit the welding current, a switch for controlling said resistance, electromagnetic operating means for the switch adapted to keep the switch open when the welding current is high and to close it when said current decreases to a predetermined value and means rendered operative by closure of the switch for deënergizing the electromagnetic operating means.

8. A welding controller provided with a resistance to limit the welding current, a switch having electromagnetic operating means responsive directly to the welding current to hold the switch open under certain electrical conditions and to close it under other electrical conditions and a second electromagnetic switch rendered operative by closure of the first switch for shunting the first switch and the resistance from the welding circuit.

9. A welding controller provided with a resistance to limit the welding current, an electromagnetic switch having a closing winding and a holding winding whereby the switch is held open under certain electrical conditions and is closed under other electrical conditions and means for shunting the windings upon closure of the switch.

10. A welding controller provided with a resistance for limiting the welding current, an electromagnetic switch having a closing winding and a holding winding responsive directly to the welding current whereby the switch is held open when current in the welding circuit is high and is closed to exclude said resistance when current decreases to a predetermined value and a second electromagnetic switch rendered operative by closure of the first switch for excluding said first switch from the welding circuit.

11. A welding controller provided with a resistance for limiting the welding current, an electromagnetic switch having a closing winding and a holding winding responsive directly to the welding current whereby the switch is held open when current in the welding circuit is high and is closed to exclude said resistance when the current decreases to a predetermined value, and a second electromagnetic switch rendered operative by closure of the first switch for excluding said first switch from the welding circuit, both of said switches being normally biased to open position, whereby the resistance is automatically re-inserted when the welding circuit is broken.

12. A controller for arc welding apparatus comprising a resistance in the circuit of the electrodes, a lockout switch in said circuit for automatically excluding said resistance as the arc is started and its resistance increases and an electromagnetic switch for excluding the lockout switch from the electrode circuit.

13. A controller for arc welding apparatus comprising a resistance in the circuit of the electrodes, a lockout switch in said circuit for automatically excluding said resistance as the arc is started and its resistance increases and an electromagnetic switch for excluding the lockout switch from the circuit of the electrodes, said electromagnetic switch being normally biased to open position whereby the resistance and the lockout switch are automatically re-inserted when the welding circuit is broken.

14. A welding controller having a resistance in the circuit of the electrodes, a switch having electromagnetic operating means responsive to the current through the electrodes to hold the switch open during the completion of the circuit through the electrodes and to close it when the electrodes are separated to draw an arc, and means for de-energizing the switch upon closure thereof.

15. A controller for arc welding apparatus having a resistance in the circuit of the electrodes, a switch having electromagnetic operating means in said circuit for holding the switch open under certain electrical conditions and for closing it under other electrical conditions to complete a shunt around said resistance and a second electromagnetic switch having operating means in said shunt circuit whereby it is closed by energization of said circuit to shunt the first switch and the resistance.

16. A controller for arc welding apparatus having a resistance in the circuit of the electrodes, a switch having electromagnetic operating means in said circuit for holding the switch open under certain electrical conditions and for closing it under other electrical conditions to complete a shunt around said resistance, and a second electromagnetic switch having operating means in said shunt circuit whereby it is closed by energization of said circuit to shunt the first switch and the resistance, both of said switches being normally biased to open position whereby the resistance is automatically re-inserted when the welding circuit is broken.

17. A controller for arc welding apparatus having a starting resistance and a limiting resistance in the circuit of the electrodes, a switch having electromagnetic operating means in said circuit for holding the switch open under certain electrical conditions and for closing it under other electrical conditions to complete a shunt around the starting resistance, and a second electromagnetic switch having operating means in said shunt circuit whereby it is closed upon energization of said circuit to shunt the first switch and the starting resistance.

18. A welding controller provided with a starting resistance and a limiting resistance in the welding circuit a switch for controlling the starting resistance, electromagnetic operating means for the switch adapted to keep the switch open under certain electrical conditions and to close it under other electrical conditions and a second electromagnetic switch rendered operative by closure of the first for shunting the first switch and the starting resistance.

19. A welding controller provided with a resistance to limit the welding current, a switch for controlling said resistance, electromagnetic operating means for the switch adapted to keep it open when the welding current is high and to close it when said current decreases to a predetermined value and means rendered operative by closure of the switch adapted to shunt the welding current through itself whereby the welding circuit is maintained closed with the resistance and the first switch excluded therefrom.

20. A welding controller provided with a resistance to limit the welding current, a switch for controlling said resistance, electromagnetic operating means for the switch adapted to keep it open when the welding current is high and to close it when said current decreases to a predetermined value and a second switch rendered operative by closure of the first switch adapted to shunt the welding current through itself whereby the welding circuit is maintained closed with the first switch and the resistance excluded therefrom.

21. A controller for arc welding apparatus having a resistance in the circuit of the electrodes, a switch having electromagnetic operating means in said circuit for holding it open under certain electrical conditions and for closing it under other electrical conditions to complete a shunt circuit around said resistance and a second switch having electromagnetic operating means in said shunt circuit adapted to close the switch when the shunt circuit is energized and thereby completing a circuit through the operating means in shunt to the first switch and the resistance whereby the welding circuit is maintained closed with the resistance and the first switch excluded therefrom.

22. A controller for arc welding apparatus having a resistance in the circuit of the electrodes, a switch having electromagnetic operating means in said circuit for holding it open under certain electrical conditions and for closing it under other electrical conditions to complete a shunt circuit around said resistance and a second switch having an electromagnetic operating winding in said shunt circuit adapted to close the switch when the shunt circuit is energized by closure of the first switch to thereby shunt the first switch and connect the operating winding of the second switch in series with the second shunt circuit whereby the welding circuit is maintained closed with the resistance and the first switch excluded therefrom.

In witness whereof, I have hereunto subscribed my name in the presence of two witnesses.

LEONARD P. COULTER.

Witnesses:
L. C. SCHANTZ,
L. D. MASON.